United States Patent
Barrow et al.

(10) Patent No.: US 7,107,337 B2
(45) Date of Patent: Sep. 12, 2006

(54) DATA STORAGE SYSTEM WITH INTEGRATED SWITCHING

(75) Inventors: Jonathan J. Barrow, Franklin, MA (US); Frederick M. Rymsha, Harvard, MA (US)

(73) Assignee: EMC Corporation, Hopkinton, MA (US)

(*) Notice: Subject to any disclaimer, the term of this patent is extended or adjusted under 35 U.S.C. 154(b) by 852 days.

(21) Appl. No.: 09/877,810

(22) Filed: Jun. 7, 2001

(65) Prior Publication Data

US 2002/0188786 A1  Dec. 12, 2002

(51) Int. Cl.
*G06F 15/173* (2006.01)

(52) U.S. Cl. .................. 709/224; 709/200; 709/223
(58) Field of Classification Search ............. 709/250; 370/248, 218, 250
See application file for complete search history.

(56) References Cited

U.S. PATENT DOCUMENTS

| | | | |
|---|---|---|---|
| 5,269,011 A | | 12/1993 | Yanai et al. |
| 5,335,352 A | | 8/1994 | Yanai et al. |
| 5,590,122 A | | 12/1996 | Sandorfi et al. |
| 5,619,497 A | | 4/1997 | Gallagher et al. |
| 5,887,270 A | | 3/1999 | Brant et al. |
| 5,941,972 A | * | 8/1999 | Hoese et al. ............... 710/315 |
| 6,260,092 B1 | * | 7/2001 | Story et al. ............... 710/315 |
| 6,324,608 B1 | * | 11/2001 | Papa et al. ............... 710/104 |
| 6,421,753 B1 | * | 7/2002 | Hoese et al. ............... 710/305 |
| 2002/0080575 A1 | * | 6/2002 | Nam et al. ............... 361/686 |
| 2002/0118685 A1 | * | 8/2002 | Linnell et al. ............... 370/400 |

FOREIGN PATENT DOCUMENTS

| | | |
|---|---|---|
| EP | 0 488 057 A1 | 6/1992 |
| WO | WO 00/55742 | 9/2000 |

OTHER PUBLICATIONS

Droms, R. "Dynamic Host Configuration Protocol." Oct. 1993. RFC 1531, Network Working Group.*
"Ping Manual Page." Dec. 1996. FreeBSD System Manager's Manual. http://snowhite.cis.uoguelph.ca/course_info/27420/ping.html.*
International Search Report from International Application No. PCT/US 01/47505, filed Oct. 30, 2001, 2 Pages.

* cited by examiner

*Primary Examiner*—Rupal Dharia
*Assistant Examiner*—Nicolas Taylor
(74) *Attorney, Agent, or Firm*—BainwoodHuang

(57) ABSTRACT

According to one embodiment of the present invention, a network adapter is provided that is used in the system to permit data communication among external data exchanging devices and an input/output (I/O) controller residing in the system. The adapter includes one or more interfaces that may be coupled to an electrical backplane in the system. The backplane is coupled to the controller, and is configured to permit communication between the controller and the adapter when the interfaces are coupled to the backplane. The adapter also includes an integrated switching system that has a first set of ports that may be coupled to the data exchanging devices and a second set of ports that may couple the switching system to the controller when the one or more interfaces are coupled to the backplane.

29 Claims, 6 Drawing Sheets

DATA STORAGE SYSTEM WITH INTEGRATED SWITCHING

FIELD OF THE INVENTION

The present invention relates generally to a network adapter (and a method of using same) that may be used in a network data storage system to facilitate communication between the system and external data exchanging devices (e.g., host computer nodes), and more specifically, to such an adapter (and method of using same) wherein integrated switching capabilities may be used to facilitate data communication among the external data exchanging devices and an input/output (I/O) controller residing in the data storage system.

BACKGROUND OF THE INVENTION

Network computer systems generally include a plurality of geographically separated or distributed computer nodes that are configured to communicate with each other via, and are interconnected by, one or more network communications media. One conventional type of network computer system includes a network data storage subsystem that is configured to provide a centralized location in the network at which to store, and from which to retrieve data. Advantageously, by using such a storage subsystem in the network, many of the network's data storage management and control functions may be centralized at the subsystem, instead of being distributed among the network nodes.

One type of conventional network data storage subsystem, manufactured and sold by the Assignee of the subject application (hereinafter "Assignee") under the tradename Symmetrix™ (hereinafter "the Assignee's conventional storage system"), includes a plurality of disk mass storage devices configured as one or more redundant arrays of independent (or inexpensive) disks (RAID). The disk devices are controlled by disk I/O controllers (commonly referred to as "back end" directors) that are coupled to a shared cache memory resource in the subsystem. The cache memory resource is also coupled to a plurality of host I/O controllers (commonly referred to as "front end" directors). The disk controllers are coupled to respective disk adapters that, among other things, interface the disk controllers to bus systems (e.g., small computer system interface (SCSI) based bus systems) used to couple the disk devices to the disk controllers. Similarly, the host controllers are coupled to respective host channel/network adapters that, among other things, interface the host controllers via channel input/output (I/O) ports to the network communications channels (e.g., Gigabit Ethernet, SCSI, Enterprise Systems Connection (ESCON), or Fibre Channel (FC) based communications channels) that couple the storage subsystem to computer nodes in the computer network external to the subsystem (commonly termed "host" computer nodes or "hosts").

In one conventional data storage network arrangement, a standalone network switch may be interjected in the communications channels intermediate to the host adapter I/O ports and the host nodes. More specifically, the host adapter channel I/O ports may be coupled to a first set of the switch's I/O ports, and a second set of the switch's I/O ports may be coupled to the host nodes. In this conventional data storage network arrangement, if the standalone network switch is appropriately configured, the host adapters (and their associated host controllers) may be able to exchange data/commands via the switch with any of the host nodes.

Unfortunately, standalone network switches tend to be relatively expensive and complex devices that may require substantial amounts of time and effort to install, configure, manage, and maintain in the data storage network. Also unfortunately, the presence of a standalone switch in the data storage network introduces into the network another stage, or hop, that the data must pass through when the data moves from the host nodes to the data storage system, and vice versa; this may increase latency in moving data from the host nodes to the data storage system, and vice versa.

SUMMARY OF THE INVENTION

In accordance with the present invention, a network adapter and method of using same are provided that overcome the aforesaid and other disadvantages and drawbacks of the prior art. In one embodiment of the present invention, a network adapter is provided that is used in a network data storage system to facilitate data communication among external data exchanging devices and an I/O controller residing in the system. The data storage system may comprise a set of mass storage devices (e.g., disk mass storage devices) that may exchange data with the data exchanging devices via the adapter. The adapter may include one or more interfaces that may be physically coupled to a signal transmission medium/system (e.g., an electrical backplane) in the system. The backplane may be coupled to the controller, and may be configured to permit data communication between the controller and the adapter when the interfaces are coupled to the backplane. The adapter includes an integrated switching system (e.g., an FC switching fabric) that has a first set of ports that may be coupled to the data exchanging devices and a second set of ports that may couple the switching system to the controller when the one or more interfaces are coupled to the backplane.

The adapter may be embodied as an electrical circuit card that may be configured to be inserted into and received by a circuit card slot in the backplane in the data storage system. When the circuit card is inserted into and received by the slot, the card may be electrically and mechanically coupled to the backplane in the data storage system such that the one or more interfaces of the card are electrically coupled to the backplane.

The adapter may be assigned a first network layer address based at least partially upon a slot identification number that identifies the location of the backplane circuit card slot in which the adapter card is inserted and resides. The first network layer address may be changed during a configuration of the data storage system to a second network layer address.

The one or more interfaces of the adapter may comprise at least one interface through which a command may be issued to the adapter to cause the adapter to change from a first (operational) mode to a second (diagnostic) mode of operation. For example, the one or more interfaces of the adapter may comprise a first interface and a second interface. The first interface may permit a processor that is external to the adapter card, the controller, and the data exchanging devices to issue a management or diagnostic testing-related command to the adapter card via the backplane. Optionally, the external processor also may be external to the data storage system itself, may be coupled to the adapter via a network, and may access the adapter card via the network, using the second network layer address. The second interface may permit the controller to issue a management or diagnostic command to the adapter card via the backplane. The one or more interfaces of the adapter may also comprise a third interface that may permit configuration-related information (e.g., information related to the configuration of the adapter) to be retrieved via the backplane from a non-volatile memory (e.g., comprising one or more electrically erasable/programmable read only memory (EEPROM) devices) comprised in the adapter card.

In the diagnostic mode of operation, a diagnostic test of the adapter may be performed. The diagnostic test may comprise either (1) a built-in self-test (BIST) of the adapter or (2) a second, special type of test of the adapter that is different from the BIST of the adapter. This second type of test of the adapter may include transmission of a respective test vector along a first circuitous test path or loop in the adapter. The first test path may both begin and terminate at a first I/O port that couples the adapter to the controller when the adapter's interfaces are coupled to the backplane; the first test path may include a subset of the first set of ports of the switching system. This second type of test of the adapter may also include the transmission of a respective test vector along a second circuitous test path or loop in the adapter. The second test path may both begin and terminate at a second, different I/O port that may couple the adapter to the controller when the adapter's interfaces are coupled to the backplane. The second test path may include a second, different subset of the first set of ports of the switching system.

In summary, a network adapter according to the present invention includes an integrated switching system. The adapter may be configured for insertion into a network data storage system, and when inserted into the network data storage system, one or more interfaces comprised in the adapter may be coupled to a signal transmission medium in the data storage system. When the one or more interfaces are so coupled to the signal transmission medium, an I/O controller in the data storage system may be able to exchange data with the adapter via the medium, and the integrated switching system may be used facilitate communication among external data exchanging devices (e.g., host computer nodes) and the controller in the data storage system. In various embodiments of the present invention, the adapter's one or more interfaces may be used to receive commands that may cause adapter to initiate diagnostic testing, provide adapter configuration-related information, and/or execute other types of functions/operations. In various embodiments of the present invention, these commands may be issued by one or more processors that may be external to or comprised within the data storage system, and/or by the controller.

As a result of the integrated switching capabilities of the network adapter of the present invention, in contrast to the aforedescribed conventional data storage network configuration, a data storage network that is appropriately configured with one or more of the network adapters of the present invention may not require a standalone switching system intermediate to the data storage system and host nodes. Advantageously, this may permit the cost and complexity of a data storage network wherein the present invention is practiced to be reduced, and may reduce the amount of time and effort required to configure, manage, and maintain such a data storage network. Further advantageously, in embodiments of the present invention, the processing required to initiate and execute diagnostic testing of network switching functionality may be carried out within the data storage system, thereby permitting the control and management of such processing to be centralized within the data storage system.

Additionally, the absence from the data storage network of a standalone switching system avoids placing the additional network hop or stage associated with the standalone switching system between the host nodes and the data storage system. Advantageously, with fewer network hops, there can be less latency in moving data between the host nodes and the data storage system, and vice versa. Further advantageously, by integrating switching functions into the network adapters of the present invention, there may be less processing overhead dedicated to managing and executing switching operations in the data storage network compared to the prior art.

These and other features and advantages of the present invention will become apparent as the following Detailed Description proceeds and upon reference to the Figures of the Drawings, in which like numerals depict like parts, and wherein:

Although the following Detailed Description will proceed with reference being made to illustrative embodiments and methods of use of the present invention, it should be understood that it is not intended that the present invention be limited to these illustrative embodiments and methods of use. On contrary, many alternatives, modifications, and equivalents of these illustrative embodiments and methods of use will be apparent to those skilled in the art. Accordingly, the present invention should be viewed broadly as encompassing all such alternatives, modifications, and equivalents as will be apparent to those skilled in art, and should be viewed as being defined only as forth in the hereinafter appended claims.

DETAILED DESCRIPTION OF ILLUSTRATIVE EMBODIMENTS

Figure 1:
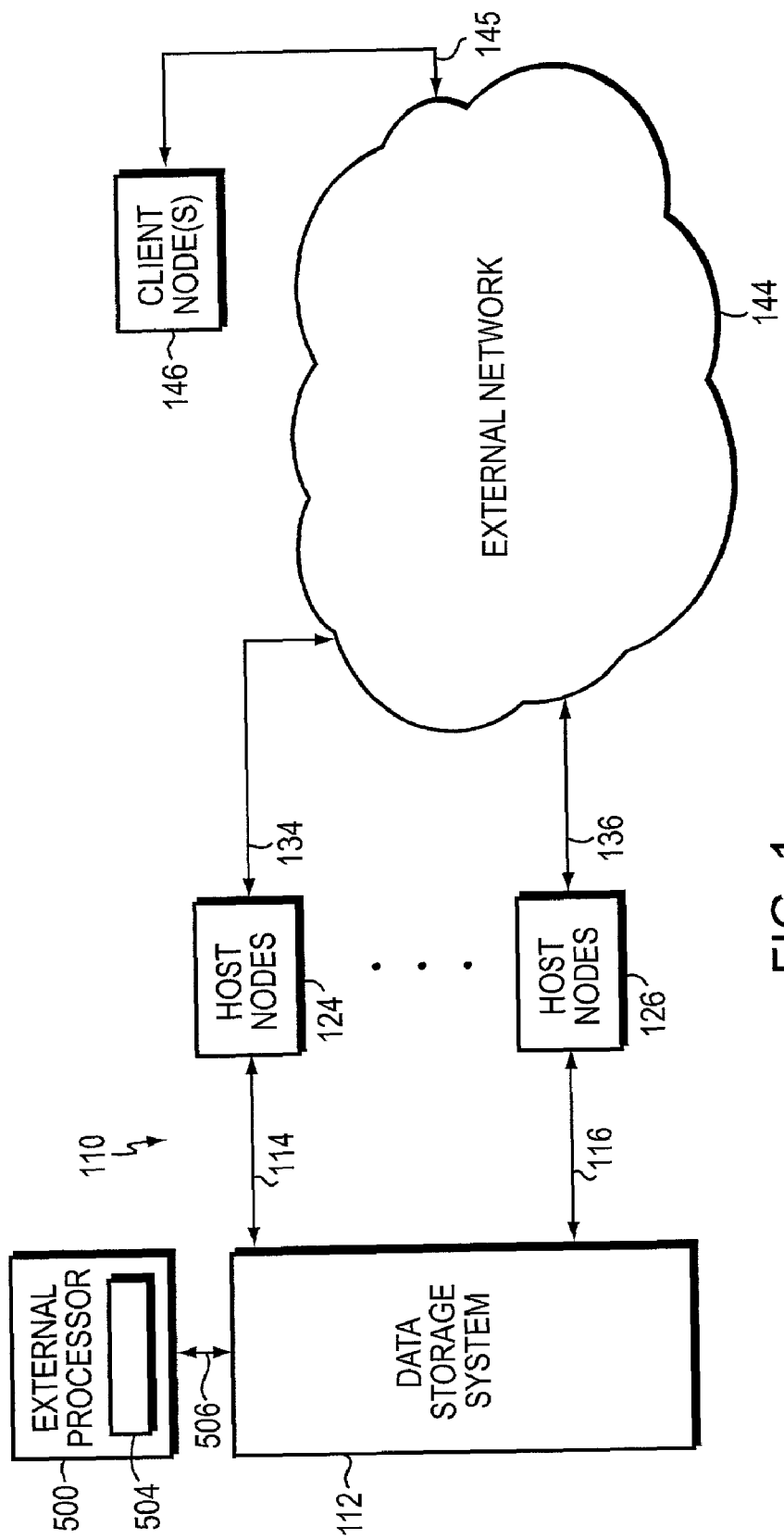
FIG. 1 is a high level functional schematic block diagram of a data storage network that includes a network data storage system having network adapters made according to one embodiment of the present invention.

Turning now to FIGS. 1–6, illustrative embodiments of the present invention will be described. FIG. 1 is a high level block diagram illustrating a data storage network 110 that includes a data storage system 112 that is coupled via respective FC protocol optical communication links (collectively referred to by numerals 114 . . . 116) to host computer nodes 124 . . . 126. Host nodes 124 . . . 126 are also coupled via additional respective conventional network communication links (collectively referred to by numerals 134 . . . 136) to an external network 144. Network 144 may comprise one or more Transmission Control Protocol/Internet Protocol (TCP/IP)based and/or Ethernet-based local area and/or wide area networks. Network 144 is also coupled to one or more client computer nodes (collectively or singly referred to by numeral 146 in FIG. 1) via network communication links (collectively referred to by numeral 145 in FIG. 1). The network communication protocol or protocols utilized by the links 134 . . . 136 and 145 are selected so as to ensure that the nodes 124 . . . 126 may exchange data and commands with the nodes 146 via network 144.

Host nodes may be any one of several well known types of computer nodes, such as server computers, workstations, or mainframes. Alternatively, or in addition thereto, some or all of the host nodes may be or comprise intermediate network computer stations, such as routers, switches, bridges, etc. In general, each of the host nodes 124 . . . 126 and client nodes 146 comprises a respective computer-readable memory (not shown) for storing software programs and data structures associated with, and for carrying out the functions and operations described herein as being carried by these nodes 124 . . . 126 and 146. In addition, each of the nodes 124 . . . 126 and 146 further includes one or more respective processors (not shown) and network communication devices for executing these software programs, manipulating these data structures, and for permitting and facilitating exchange of data and commands among the host nodes 124 . . . 126 and client nodes 146 via the communication links 134 . . . 136, network 144, and links 145. The execution of the software programs by the processors and network communication devices included in the hosts 124 . . . 126 also permits and facilitates exchange of data and commands among the nodes 124 . . . 126 and the system 112 via the FC links 114 . . . 116, in the manner that will be described below.

Figure 2:
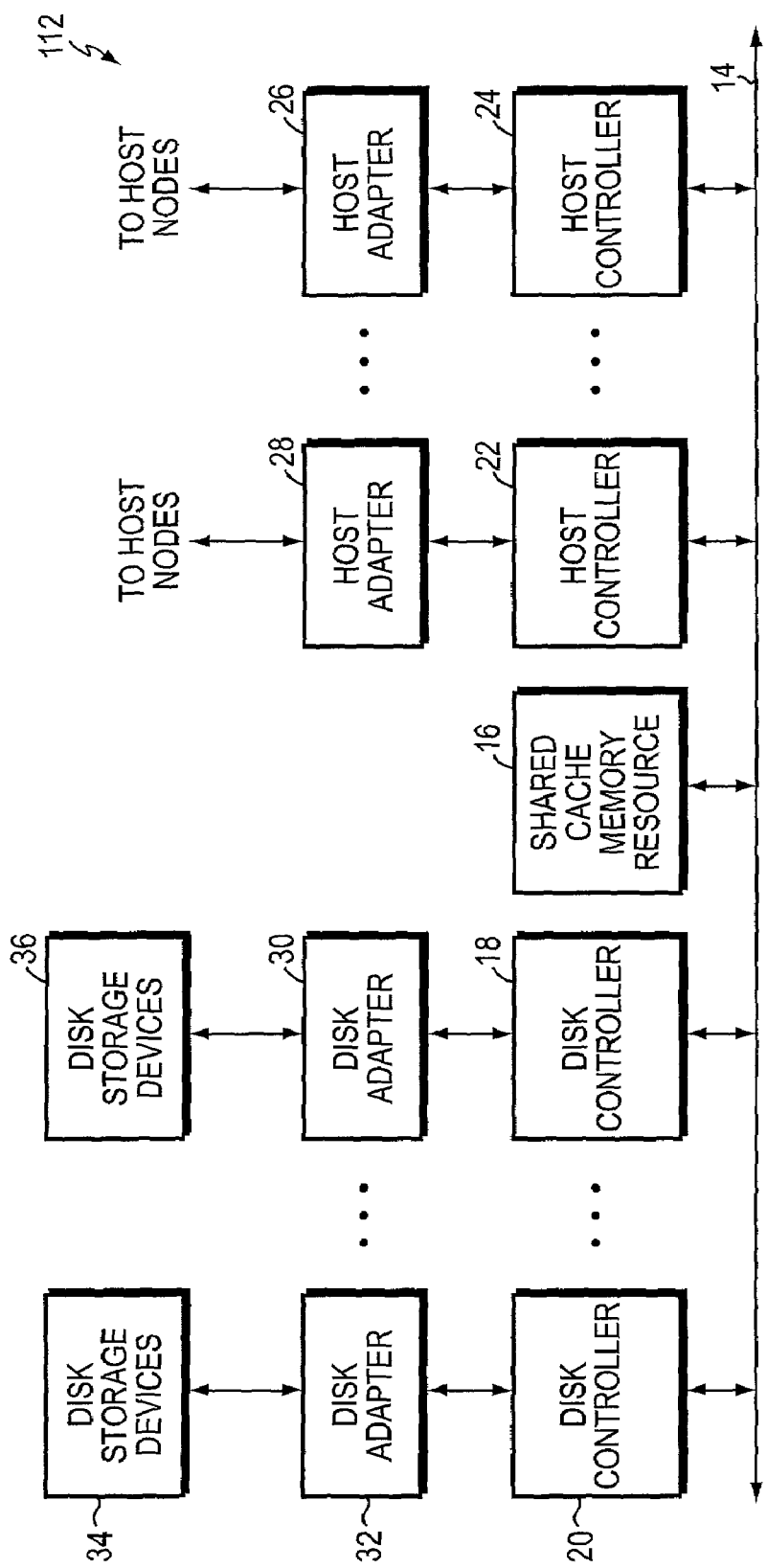
FIG. 2 is a high level functional schematic block diagram illustrating functional components of the network data storage system included in the data storage network shown in FIG. 1.

FIG. 2 is a high level schematic block diagram of functional components of the system 112. System 112 may include a bus system 14 that electrically couples together a plurality of host controllers 22 . . . 24, a plurality of disk controllers 18 . . . 20, and a shared cache memory resource 16. Bus system 14 may include a plurality of redundant buses (not shown) and bus arbitration, termination, and control systems (also not shown).

Figure 3:
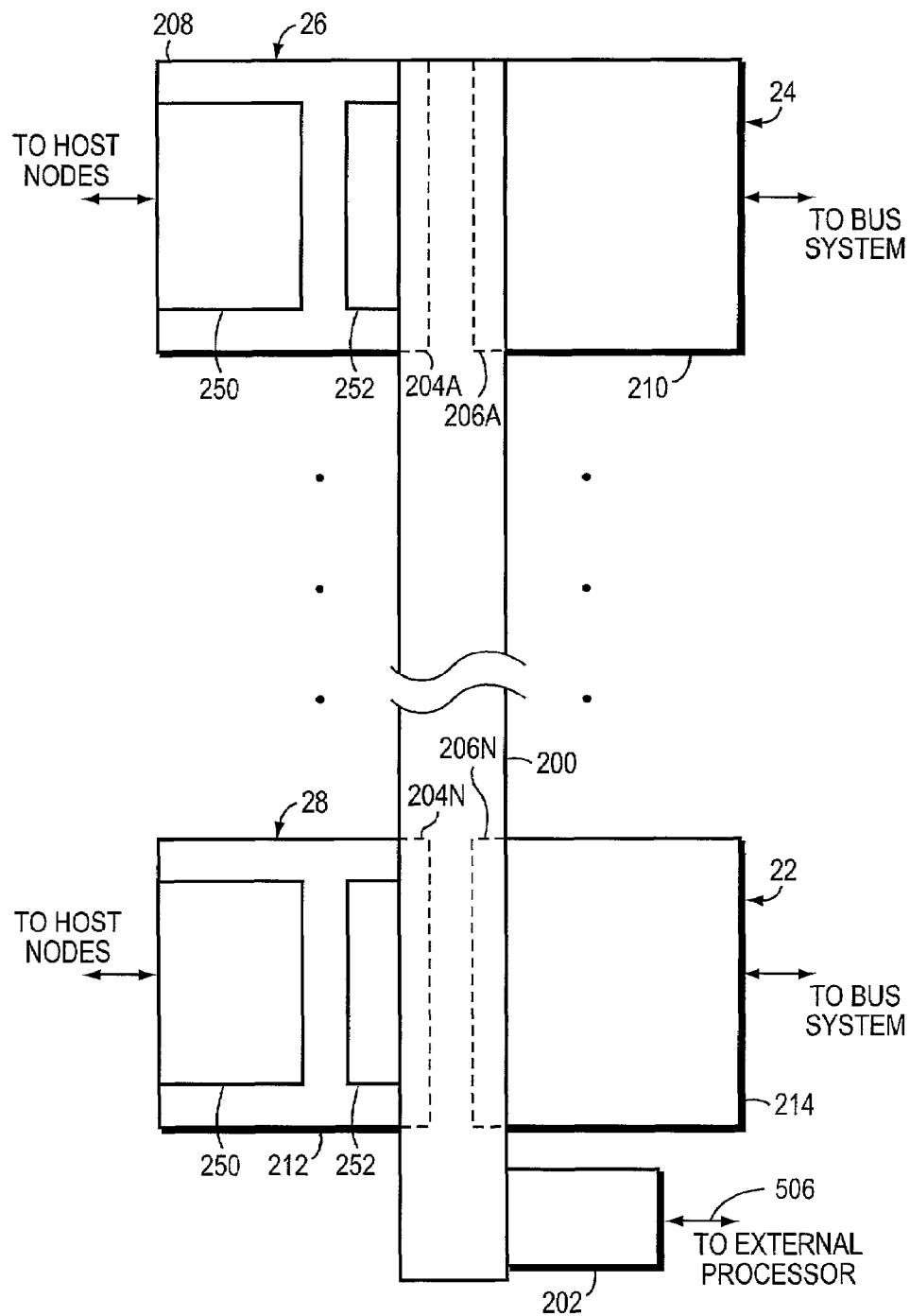
FIG. 3 is high level schematic block diagram illustrating the manner in which the network adapters made according to one embodiment of the present invention may be coupled to an electrical backplane in the network data storage system illustrated in FIG. 2.
Figure 4:
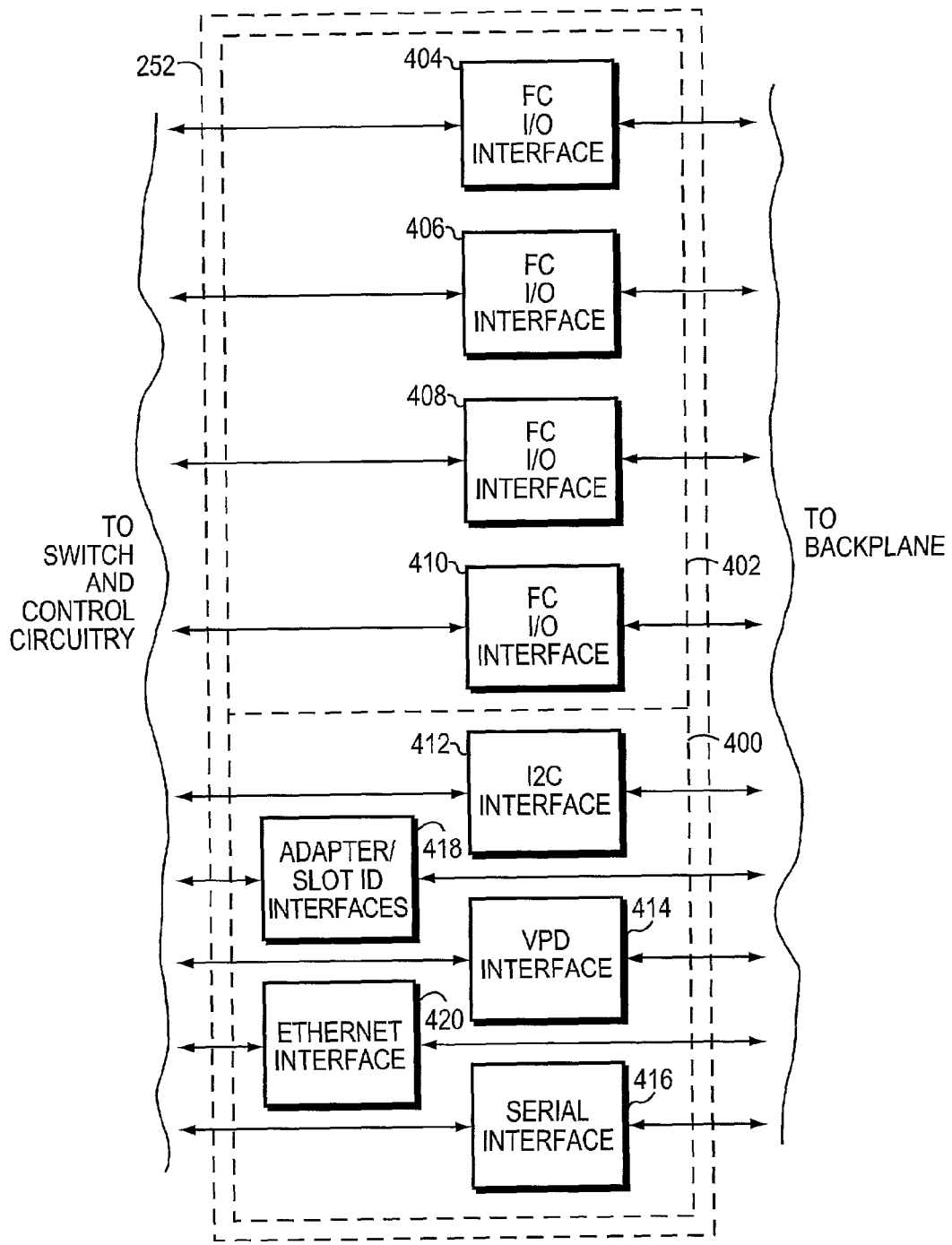
FIG. 4 is high level functional block diagram illustrating one or more backplane interfaces that may be comprised in a network adapter made according to one embodiment of the present invention.

Each host controller 22 . . . 24 may comprise a single respective electrical circuit card or panel. For example, as is shown in FIG. 3, the controllers 22, 24 may each comprise a single respective electrical circuit card or panel 214, 210. Likewise, each disk controller 18 . . . 20 may comprise a single respective electrical circuit card or panel. Each disk adapter 30 . . . 32 may comprise a single respective electrical circuit card or panel. Likewise, each host adapter 26 . . . 28 may comprise a single respective electrical circuit card or panel. For example, as is shown in FIG. 3, the host adapters 26, 28 may each comprise a single respective electrical circuit card or panel 208, 212. Each host controller may be electrically and mechanically coupled to a respective host adapter via a respective mating electromechanical coupling system, which system is described more fully below.

In this embodiment of system 112, although not shown explicitly in the Figures, each host adapter 26 . . . 28 may be coupled to twenty respective host nodes via respective FC links. For example, in this embodiment of system 112, host nodes 124 may include twenty host nodes, and adapter 26 may be coupled to each of these host nodes via respective FC links comprised in links 114. It should be appreciated that the number of host nodes to which each host adapter 26 . . . 28 may be coupled may vary, depending upon the particular configurations of the host adapters 26 . . . 28, and host controllers 22 . . . 24, without departing from this embodiment of the present invention. For example, without departing from this embodiment of the present invention, host nodes 124 may include twelve host nodes, and adapter 26 may be coupled to each of these host nodes via respective FC links comprised in links 114.

Disk adapter 32 is electrically coupled to a set of mass storage devices 34, and interfaces the disk controller 20 to those devices 34 so as to permit exchange of data and commands between processors (not shown) in the disk controller 20 and the storage devices 34. Disk adapter 30 is electrically coupled to a set of mass storage devices 36, and interfaces the disk controller 18 to those devices 36 so as to permit exchange of data and commands between processors (not shown) in the disk controller 18 and the storage devices 36. The devices 34, 36 may be configured as redundant arrays of conventional disk mass storage devices. It should be understood, however, that if system 112 is appropriately modified in ways apparent to those skilled in the art, mass storage devices 34, 36 may comprise optical, solid state, or other types of memory devices without departing from the present invention.

It should be appreciated that the respective numbers of the respective functional components of system 112 shown in FIG. 2 are merely for illustrative purposes, and depending upon the particular application to which the system 112 is intended to be put, may vary without departing from the present invention. For example, it may be desirable to permit the system 112 to be capable of failover fault tolerance in the event of failure of a particular component in the system 112. Thus, in practical implementation of the system 112, it may be desirable for system 112 to include redundant functional components and mechanisms for ensuring that the failure of any given functional component is detected and the operations of any failed functional component are assumed by a respective redundant functional component of the same type as the failed component.

The general manner in which data may be retrieved from, and stored in the system 112 will now be described. Broadly speaking, in operation of system 110, a client node 146 may forward a request to retrieve data to a host node (e.g., one host node comprised in the group of host nodes 124, hereinafter termed "the retrieving host node") via one of the links 145 associated with the client node 146, network 144 and one of the links 134 associated with the retrieving host node. If data being requested is not stored locally at the retrieving host node, but instead, is stored in the data storage system 112, the retrieving host node may request the forwarding of that data from the system 112 via the respective one of the FC links 114 with which the retrieving host node is associated and coupled.

The request forwarded via the retrieving host node is initially received by the host adapter 26 that is coupled to the FC links 114. The host adapter 26 may then forward the request to the host controller 24 to which it is coupled. In response to the request forwarded to it, the host controller 24 may then ascertain from data storage management tables (not shown) stored in the cache 16 whether the data being requested is currently in the cache 16; if the requested data is currently not in the cache 16, the host controller 24 may request that the disk controller (e.g., controller 18) associated with the storage devices 36 within which the requested data is stored retrieve the requested data into the cache 16. In response to the request from the host controller 24, the disk controller 18 may forward via the disk adapter 30 to which it is coupled appropriate commands for causing one or more of the disk devices 36 to retrieve the requested data. In response to such commands, the devices 36 may forward the requested data to the disk controller 18 via the disk adapter 30. The disk controller 18 may then store the requested data in the cache 16.

When the requested data is in the cache 16, the host controller 22 may retrieve the data from the cache 16 and forward it to the retrieving host node via the adapter 26 and the respective one of the links 114 to which the retrieving host node is coupled. The retrieving host node may then forward the requested data to the client node 146 that requested it via a respective one of the links 134, network 144 and the link 145 associated with the client node 146.

Additionally, a client node 146 may forward a request to store data to a host node (e.g., one of the host nodes in the group of host nodes 124, hereinafter termed "the storing host node") via one of the links 145 associated with the client node 146, network 144 and the respective one of the links 134 associated with the storing host node. The storing host node may store the data locally, or alternatively, may request the storing of that data in the system 112 via the respective FC link, comprised in links 114, associated with the storing host node.

The data storage request forwarded via the respective FC link associated with the storing host node is initially received by the host adapter 26. The host adapter 26 may then forward the data storage request to the host controller 24 to which it is coupled. In response to the data storage request forwarded to it, the host controller 24 may then initially store the data in cache 16. Thereafter, one of the disk controllers (e.g., controller 18) may cause that data stored in the cache 16 to be stored in one or more of the data storage devices 36 by issuing appropriate commands for same to the devices 36 via the adapter 30.

With particular reference being made to FIGS. 2–6, the construction and operation of illustrative embodiments of the present invention will now be described. System 112 includes a plurality of electrical backplanes, including backplane 200. Backplane 200 includes a first plurality of backplane connection slots 204A . . . 204N, and a second plurality of backplane connection slots 206A . . . 206N. Each of the host adapter cards is configured and dimensioned to permit the host adapter cards to be inserted into and received by respective of the first plurality of backplane connection slots 204A . . . 204N, such that, when the host adapter cards are so inserted into and received by the slots 204A . . . 204N, the host adapter cards become electrically and mechanically coupled to the backplane 200 via the slots 204A . . . 204N. For example, host adapter cards 208, 212 are configured and dimensioned to permit cards 208, 212 to be inserted into and received by slots 204A, 204N, respectively, such that, when the cards 208, 212 are so inserted into and received by the slots 204A, 204N, the cards 208, 212 become electrically and mechanically coupled to the backplane 200 via the slots 204A, 204N. Likewise, each of the host controller cards is configured and dimensioned to permit the host controller cards to be inserted into and received by respective of the second plurality of backplane connection slots 206A . . . 206N, such that, when the host controller cards are so inserted into and received by the slots 20A . . . 206N, the host controller cards become electrically and mechanically coupled to the backplane 200 via the slots 206A . . . 206N.

For example, host controller cards 210, 214 are configured and dimensioned to permit the host controller cards 210, 214 to be inserted into and received by slots 206A, 206N, respectively, such that, when the host controller cards 210, 214 are so inserted into and received by the slots 206A, 206N, respectively, the cards 210, 214 become electrically and mechanically coupled to the backplane 200 via the slots 206A, 206N.

Backplane 200 includes a plurality of internal electrical connections (not shown). These internal connections are configured such that, when the host controller and host adapter cards are properly inserted into and received by appropriate respective backplane connection slots, each host controller becomes electrically coupled to the respective host adapter with which it is associated, and each host controller and host adapter is electrically coupled to an external processor interface 202 (whose purpose is described more fully below). For example, when host controller cards 210, 214 are so inserted into and received by slots 206A, 206N, respectively, and host adapter cards 208, 212 are so inserted into and received by slots 204A, 204N, respectively, host controller 24 becomes electrically coupled via the backplane's internal electrical connections to its associated host adapter 26, host controller 22 becomes electrically coupled via these connections to its associated host adapter 28, and the connections also electrically couple the host controllers 22, 24 and adapters 26, 28 to interface 202.

Each of the host adapters 26 . . . 28 in the system 112 has an identical respective construction and operation; thus, only the construction and operation of a single host adapter 26 will be described herein. When the electrical circuit card 208 that comprises host adapter 26 is properly inserted into and received by the slot 204A, one or more backplane interfaces 252 of the network adapter card 208 become electrically and mechanically coupled to the backplane 200. The interfaces 252 comprise a plurality of adapter control and management interfaces 400 and a plurality of FC I/O interfaces 402. The control interfaces 400 may comprise a conventional Inter-IC ("I2C") protocol control bus interface 412, a vital product data interface 414, a serial management/diagnostics interface 416, host adapter card identification/backplane slot identification interfaces 418, and an Ethernet network interface 420. In this illustrative embodiment of the present invention, the FC I/O interfaces 402 may comprise four FC I/O interfaces 404, 406, 408, 410; however, the number of the FC I/O interfaces comprised in the I/O interfaces 402 may vary, so as to coincide with the number of I/O ports in the controller 24, without departing from the present invention.

When the interfaces 252 become coupled to the backplane 200, the I/O interfaces 402 become coupled via the backplane's internal electrical connections to the host controller 24 with which the adapter 26 is associated, the interfaces 412, 416, and 418 become electrically coupled via the connections to the controller 24, and the interface 420 becomes electrically coupled via the connections to the interface 202. Alternatively, or in addition thereto, the interfaces 414 and 418 may become electrically coupled via the connections to the interface 202.

Figure 5:
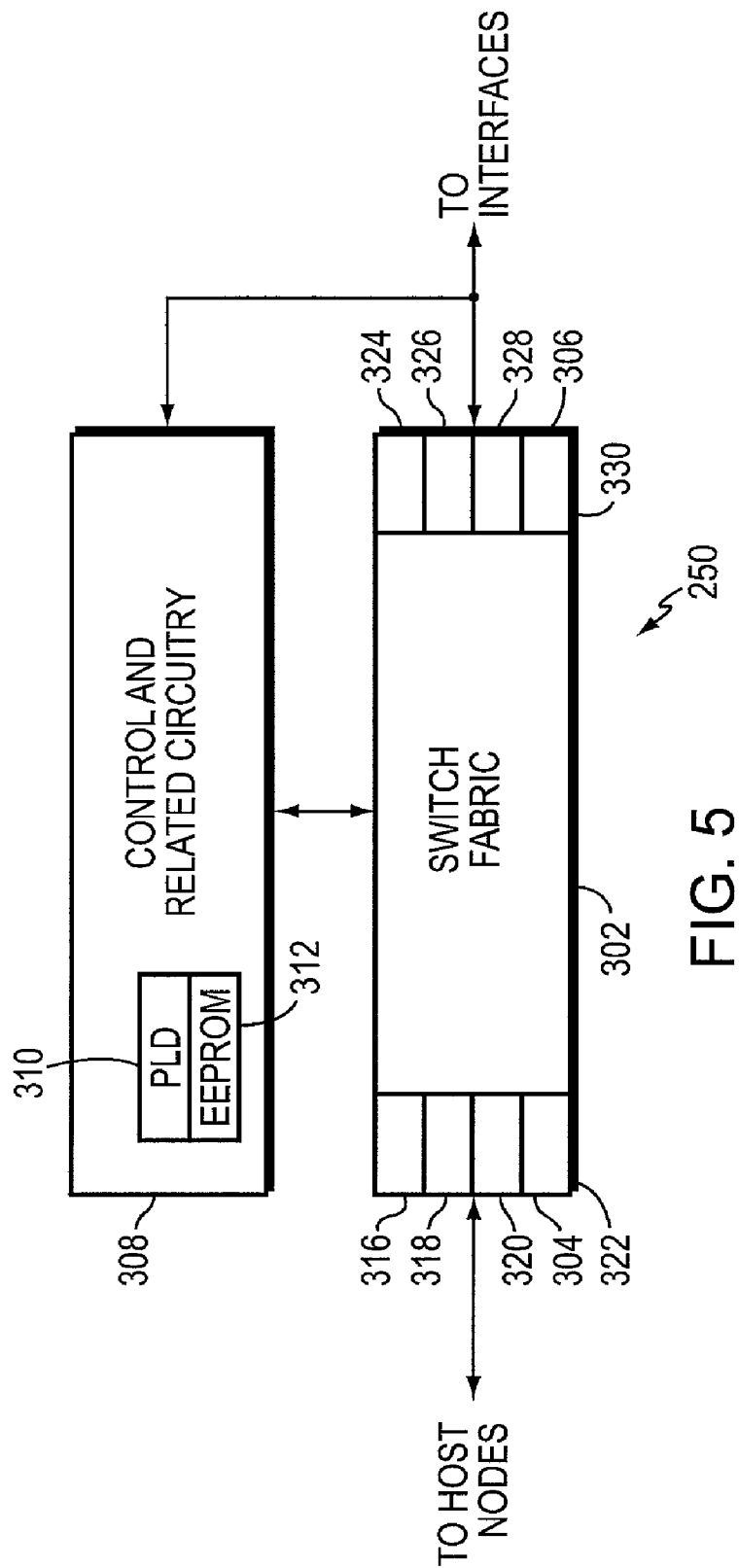
FIG. 5 is a high level block diagram illustrating functional components of switch and control circuitry that may be comprised in a network adapter made according to one embodiment of the present invention.
Figure 6:
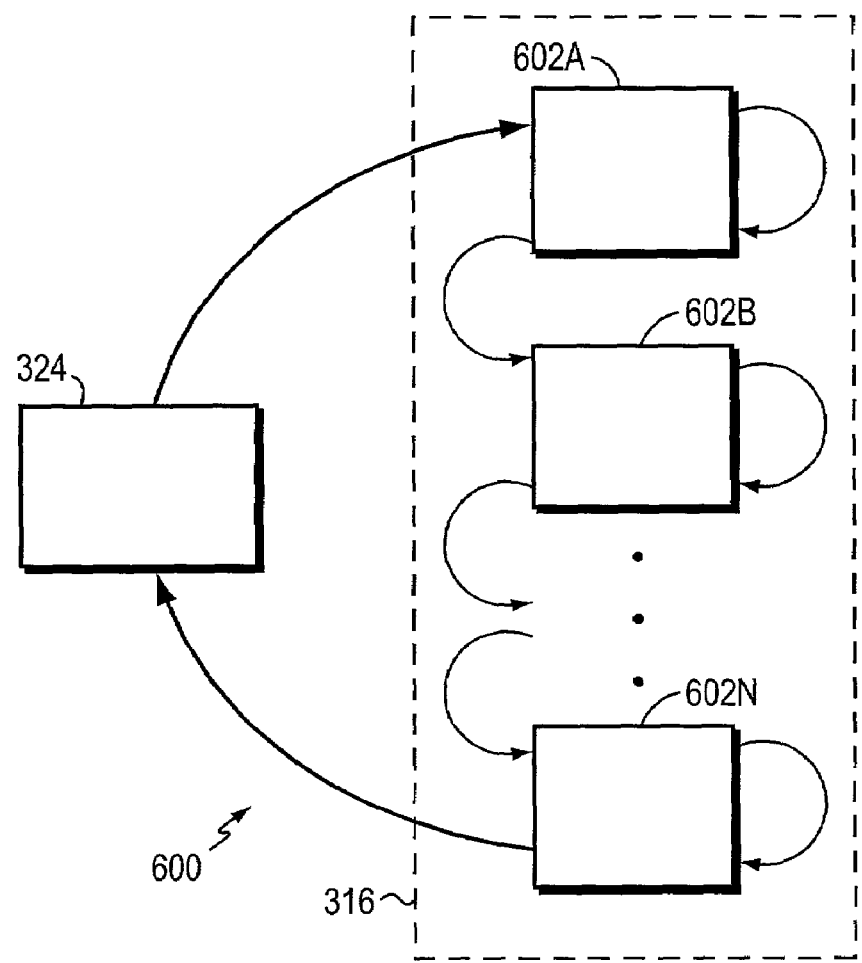
FIG. 6 is a schematic diagram illustrating the manner in which diagnostic test vectors/patterns may be transmitted in a network adapter made according to one embodiment of the present invention, when the adapter is executing a special type of diagnostic test.

In adapter 26, the interfaces 252 are electrically coupled to switch and control circuitry 250. As is shown in FIG. 5, circuitry 250 includes an FC switch fabric 302 having two sets 304, 306 of I/O ports, and control and related circuitry 308. Depending upon the particular configuration of the adapter 26, one set 304 of the switch fabric's I/O ports may comprise either twelve or twenty I/O ports that may be evenly divided among four subsets 316, 318, 320, 322 of the switch ports. In this embodiment of the present invention, the set 304 comprises twenty I/O ports. Thus, in this embodiment, each of the subsets 316, 318, 320, 322 may comprise five respective FC I/O ports. Each of the I/O ports in set 304 may be coupled to a respective host node in group 124 via a respective FC link comprised in links 114.

The other set 306 of the switch fabric's I/O ports comprises a number of I/O ports that is equal to the number of FC I/O interfaces comprised in the I/O interfaces 402. Thus, in this embodiment of the present invention, set 306 of I/O ports comprises four I/O ports 324, 326, 328, 330; each of the ports 324, 326, 328, 330 is coupled to a respective one of the interfaces 404, 406, 408, 410.

Each subset 316, 318 320, 322 of the external switch ports 304 is logically associated with, assigned, or mapped to a respective one of the internal switch ports 324, 326, 328, 330, respectively. In accordance with this switch port zone mapping/assignment scheme, the FC communication protocol frames received by the fabric 302 from the external ports in subset 316 may be forwarded by the fabric 302 to internal port 324; FC frames received by the fabric 302 from the external ports in subset 318 may be forwarded by the fabric 302 to internal port 326; FC frames received by the fabric 302 from the external ports in subset 320 may be forwarded by the fabric 302 to the internal port 328; FC frames received by the fabric 302 from the external ports in subset 322 may be forwarded by the fabric to the internal port 330.

Similarly, an FC frame received by the fabric 302 from internal port 324 may be forwarded by the fabric 302 to an appropriate one of the ports in the subset 316, depending upon the particular destination N_Port identifier (i.e., D_ID) associated with the frame; an FC frame received by the fabric 302 from internal port 326 may be forwarded by the fabric 302 to an appropriate one of the ports in the subset 318, depending upon the particular D_ID associated with the frame; an FC frame received by the fabric 302 from internal port 328 may be forwarded by the fabric 302 to an appropriate one of the ports in the subset 320, depending upon the particular D_ID associated with the frame; and, an FC frame received by the fabric 302 from internal port 330 may be forwarded by the fabric 302 to an appropriate one of the ports in the subset 322, depending upon the particular D_ID associated with the frame.

Switch fabric 302 may be controlled by circuitry 308, based upon signals provided to the circuitry 308 from the interfaces 252. More specifically, circuitry 308 may control the switching system 302 based upon signals provided to the circuitry 308 from the control interfaces 400. In addition thereto, if circuitry 250 is appropriately configured, the circuitry 308 may control the switch fabric 302 based upon in-band control signals provided to the circuitry 250 via the I/O interfaces 402.

For reasons that are discussed below, circuitry 308 comprises a programmable logic device (PLD) 310 and erasable programmable read only memory (EEPROM) 312. PLD 310 and EEPROM 312 are coupled to interface 416 and 414, respectively.

After the system 112 has executed an initial power-up or reset boot procedure, the adapter 26 may initially enter a default mode of operation. In this default mode of operation, the switch fabric 302 may operate in accordance with predetermined default configuration parameters. These parameters may specify, e.g., among other things, an initial network layer address offset (e.g., 192.168.148.16) to be used in determining a specific respective network layer address (e.g., an IP address) to be assigned to the adapter 26, an initial domain identification offset (e.g., 16 decimal) to be used in determining a specific respective logical network domain identification value to be assigned to the adapter 26, an initial switch fabric port behavioral configuration for the switch ports 304, 306 (e.g., wherein the ports 304, 306 may operate as FC switch fabric "F Ports"), an initial zoning of ports 304 (e.g., comprising respective subsets 316, 318, 320, 322 of five external ports each, as shown in FIG. 5), an initial default assigment/mapping of the internal switch ports 324, 326, 328, 330 to the external switch ports in subsets 316, 318, 320, 322 (e.g., an initial assignment of which internal ports 324, 326, 328, 330 may be associated with or mapped to external ports in subsets 316, 318, 320, 322 in the manner described previously), initial simple network management protocol (SNMP) port/destination port values, an initial mode of operation for the adapter 26 (e.g., a normal (i.e., non-diagnostic and non-testing) mode of operation in which FC frames, ordered sets, and so forth, may be exchanged between the controller 24 and the host nodes 124 via the switch fabric 302 using conventional FC switch fabric communication protocol techniques), default port time out values, etc. These default parameters may be preprogrammed into the circuitry 308, and circuitry 308 may control the fabric 302 so as to cause the fabric 302 to be configured and operate in accordance with these parameters.

In the normal operating mode of the adapter 26, after the external ports 304 have been brought on-line (e.g., via appropriate manual intervention by a human operator), the switch ports 304 may convert respective optical FC communication signals received by the host adapter 26 via the channels 114 into respective corresponding FC electrical signals that may be provided to the fabric 302. Ports 304 also may convert respective FC electrical communication signals received from the switch fabric 302 into respective corresponding optical FC communication signals that may be provided by the host adapter 26 via the channels 114 to appropriate host nodes 124. The electrical FC communication signals provided to the switch fabric 302 by the ports 304 may embody and/or comprise FC communication protocol frames. These frames may be forwarded by the switch fabric 302, in accordance with well known conventional FC switching techniques and the previously described switch port zone mapping assignment scheme, to appropriate ones of the internal ports 324, 326, 328, 330. Frames received from the switch fabric 302 by the ports 324, 326, 328, 330 may be transmitted from the ports 324, 326, 328, 330 to the controller 24 via interfaces 404, 406, 408, 410, respectively, and the backplane 200.

Similarly, the electrical FC communication signals provided to the switch fabric 302 by the internal ports 306 may also embody FC communication protocol frames. These frames may be forwarded by the fabric 302, in accordance with well known conventional FC switching techniques and the previously described port zone mapping assignment scheme, to appropriate ones of the external ports 304.

In the normal mode of operation, the controller 24 may monitor and control operation of the circuitry 308 by exchanging data and commands with the circuitry 308 via conventional I2C serial bus interface 412, using conventional I2C protocol. These commands may be transmitted through the interface 412 to the circuitry 308 via a conventional I2C bus (not shown).

System 110 also includes a computer processor 500 that is external to the host nodes 124 . . . 126, adapters 26 . . . 28, and controllers 22 . . . 24. Processor 500 may be coupled to the backplane 200 via a conventional hub system that may be comprised in interface 202, and via communication link 506. The not shown electrical connections in the backplane 200 may include conventional 10BaseT connections that may couple, among other things, the adapters 26 . . . 28 and controllers 22 . . . 24 to the interface 202 such that the processor 500 may exchange data and commands with the adapters 26 . . . 28 and controllers 22 . . . 24 using conventional Ethernet protocol communication techniques. The Ethernet interface 420 comprised in adapter 26 may be used to couple the circuitry 308 in adapter 26 to the processor 500 via one of the 10BaseT connections in the backplane 200.

A human user may review and modify the aforesaid and/or other default configuration parameters via a configuration/management utility program 504 that may be executed by and resident in computer processor 500. More specifically, when executed by the processor 500, program 504 may provide a graphical user interface that may permit the human user to be able to exchange data and commands with the circuitry 308 and switch fabric 302 via the interface 420 and that may allow the human user to monitor and control the operation and internal states of the circuitry 308 and switch fabric 302. By appropriately controlling the operation and internal states of the circuitry 308 and switch fabric 302, the human user may change some or all of the aforesaid and other default configuration parameters, and may otherwise control the configuration and operation of the circuitry 308 and switch fabric 302. For example, the human user may control the switch fabric 302 via the interface 504 so as to change, among other things, the respective behavioral configurations of the ports 304, 306 such that selected ones of the ports 304, 306 may operate as FC switch fabric "E_Ports" (e.g., to permit the adapter 26 to be linked via an interswitch link to another switching device, such as another adapter 28 made according to the present invention), "G_Ports," "FL_Ports," or other types of conventional FC switch fabric ports. The configuration parameters that have been changed by the user via the program 504 may be stored in the circuitry 308 or another storage location in system 112 that is accessible by the circuitry 308, and may persist despite subsequent rebooting and/or resetting of the system 112 and/or adapter 26, unless and until they are again changed by the user.

Additionally, while the adapter 26 is in the normal operating mode, the controller 24 may issue a command to the circuitry 308 via the interface 414 that, when received by the circuitry 308 may cause the circuitry 308 to retrieve from the non-volatile EEPROM 312 information related to the configuration of the adapter 26. Such configuration-related information may comprise or specify, e.g., among other things, a part number assigned to the card 208 by the manufacturer of the card 208, a serial number assigned to the card 208, a revision level of the hardware/software embodied in the card 208, text comments associated with the card 208 (e.g., written by a human technician that may describe previous problems encountered by, or repairs made to the card 208), etc. This information may be written to the EEPROM 312 during manufacturing, repair, and/or troubleshooting of the card 208 so as to make easier future processing, diagnostics, repair, and troubleshooting of the card 208. The information retrieved from the EEPROM 312 may be forwarded by the circuitry 308 to the controller 24 via the interface 414. The command issued via the interface 414 by the controller 24 may be initiated in response to receipt by the controller 24 of a request issued by the processor 500 for selected information contained in the EEPROM 312. After receiving the information retrieved from the EEPROM 312, the controller 24 may supply the information to the processor 500 for use and/or display by the program 504.

The program 504 may also allow the human user to issue to the circuitry 308 via the interface 420 in adapter 26 a command for initiating diagnostic testing of the adapter 26. This command, when received by the circuitry 308, may cause the adapter 26 to change from the initial, normal operational mode that the adapter 26 enters after an initial power-up or resetting of the adapter 26 or system 112, to a diagnostic testing mode of operation. In this diagnostic mode of operation, the adapter 26 may execute one or more diagnostic routines or procedures. These procedures may include one or more conventional built-in self-tests (BIST) of the adapter 26 itself, circuitry 308, switch fabric 302, interfaces 252, and/or components or portions thereof. The types and/or nature of the one or more BIST executed by the adapter 26 may be selected by the human user using the program 504. The user may use the program 504 to monitor the execution of the one or more BIST by the adapter, and after the adapter 26 has completed execution of the one or more BIST selected by the user, the circuitry 308 may report the results of the one or more BIST to the program 504 via the interface 420, and the program 504 may cause these results to be displayed in a form that is understandable by the user. In addition, the adapter 26 may be programmed to execute one or more power-on self-test diagnostic routines or procedures at power-up of the adapter 26.

The controller 24 may also cause the adapter 26 to change from the normal mode of operation to the diagnostic testing mode of operation. The controller 24 may accomplish this by issuing an appropriate diagnostic command to a PLD 310 via serial interface 416. Depending upon the diagnostic command issued to the PLD 310 by the controller 24, the adapter 26 may be caused to execute either (1) one or more conventional BIST of the adapter 26 itself, circuitry 308, switch fabric 302, interfaces 252, and/or components or portions thereof, or (2) a special diagnostic test that is novel compared to conventional BIST. In the special diagnostic test, respective predetermined sets of test vectors are transmitted through respective circuitous serial test paths or loops. Each such test loop comprises a respective internal switch port and the external test ports comprised in the respective switch port zone associated with the respective internal switch port. For example, given the configuration of the switch system 302, four such respective serial test loops may be used in executing the special diagnostic test in this embodiment of the present invention. The first of these test loops may comprise the internal port 324 and the external ports comprised in the subset 316. The second test loop may comprise the internal port 326 and the external ports comprised in the subset 318. The third test loop may comprise the internal port 328 and the external ports comprised in the subset 320. The fourth test loop may comprise the internal port 330 and the external ports comprised in the subset 322. The manner in which testing is performed in each of these test loops according to this special diagnostic test is substantially similar. Accordingly, in order to avoid unnecessary duplication of description, the testing of only a single testing loop or path 600 according to this special procedure will be described herein, with particular reference being made to FIG. 6.

Testing of the loop 600 according to this special diagnostic procedure begins with the transmission to internal port 324 of serial test vector data from controller 24 via the interface 404. The internal switch port 324 transmits the serial test vector data received from the controller 24 to a first external switch port 602A in subset 316. The port 602A transmits the serial data via its external transmit port (i.e., the port that ordinarily would be used to transmit data from the port 602A to a respective host node via a respective one of the links 114) to its external receive port (i.e., the port that ordinarily would be used to receive data at the port 602A from the respective one of the links 114). The serial test data received by the external receive port of port 602A is transmitted from the port 602A via the switch 302 to a succeeding external port 602B in the subset 316. The port 602B transmits the serial test data via its external transmit port (i.e., the transmit port that ordinarily would be used to transmit data from the port 602B to a respective host node via a respective one of the links 114) to its external receive port (i.e., the receive port that ordinarily would be used to receive data at the port 602B from the respective one of the links 114). The serial data received by the external receive port of port 602B is then transmitted from the port 602B via the switch 302 to a next succeeding external port (not specifically referenced in FIG. 6) in the subset 316, and the process of transmitting the serial test data is repeated, in the manner described above, for each of the remaining external switch ports comprised in the subset 316. The last such external switch port 602N in subset 316 completes the test loop 600 by transmitting the test vector data via the switch 302 back to the internal switch port 324. The port 324 then transmits to the controller 24, via the interface 404, the test vector data received via the switch 302 from the last port 602N in the subset 316. The controller 24 may then compare the set of test vector data initially supplied to the port 324 by the controller 24 with the set of test vector data returned to the controller 24 from the port 324. If the two sets match, the controller 24 may determine that the adapter 26 passed the special diagnostic test. If the two sets do not match, the controller 24 may determine that the adapter 26 failed the special diagnostic test.

After completing the execution of the one or more diagnostic routines or procedures, the adapter 26 may change from the diagnostic mode to the normal operating mode. Thereafter, the adapter 26 may continue to operate in the normal operating mode.

The processor 500 may command the controller 24 to command the adapter 26 to change from the normal mode of operation to the diagnostic mode of operation and may specify the type of diagnostic testing that the controller 24 is to command the adapter 26 to execute (e.g., one or more BIST or the special diagnostic test). The processor 500 may be comprised in system 112, or alternatively, as is shown in FIG. 2, the processor 500 may be external to the system 112. If the processor 500 is external to the system 112, the processor 500 may exchange data and commands with these components using conventional TCP/IP protocol. For example, in this alternative arrangement, the link 506 may comprise a conventional TCP/IP network link between the interface 202 and the processor 500, and the interface 420 in adapter 26 may be configured to permit the adapter 26 to be able to receive and transmit TCP/IP command and data packets with the processor 500 via the link 506, interface 202, and internal electrical connections in the backplane 200.

In this alternative arrangement, the adapter 26 may be assigned an IP address to be used in communicating with the external processor 500. This IP address may be determined by adding to the network layer address offset (as initially predetermined in the default parameters, or as modified by the user via processor 500) the value specified by the last four bits of a backplane connection slot identification number assigned to the backplane slot 204A in which the adapter card 208 is inserted. That is, each of the connection slots 204A . . . 204N may be hardwired to generate a respective slot identification number that indicates the location/position of the slot relative to the other such slots in the backplane 200, and when a respective one of the adapter cards (e.g., adapter card 208) is properly inserted into a respective one of the backplane slots (e.g., slot 204A), the respective slot identification number associated with that backplane slot 204A may be communicated to the control circuitry 308 in the respective adapter card 208 via the slot identification interface comprised in the card's interfaces 418. This identification number may then be used to generate the IP address that the adapter 26 may use to communicate with the external processor 500. The default IP address offset in the default parameters may be changed, using the program 504, to second and/or subsequent offset values, as desired by the user of program 504. This may have the result of changing the initial network layer address assigned to the adapter 26 based upon the initial network layer address offset and the slot location identification number to another network layer address.

Although not shown in the Figures, it should be understood that processor 500 may include a computer-readable memory that stores software programs and data structures associated with, and for carrying out the inventive and other functions, methods, techniques, and operations described herein as being carried out by the processor 500. Additionally, the external processor 500 may include a computer processor, computer user interface, and networking and other circuitry that are configured to execute these software programs and manipulate these data structures. The execution of the software programs by the computer processor, computer user interface, and the networking and other circuitry in processor 500 may cause and facilitate the inventive and other functions, methods, techniques, and operations described herein as being carried out by the external processor 500. It will be apparent to those skilled in the art that many types of computer processors, computer user interface and networking circuitry, and computer-readable memories may be used according to the teachings of the present invention to implement processor 500.

Further alternatively, although not shown in the Figures, if appropriately modified in ways apparent to those skilled in the art, the data storage network 110 may comprise two processors of the type of processor 500. In this further alternative arrangement, one of these two processors may be comprised in the system 112, but may be external to the adapters 26 . . . 28 and controllers 22 . . . 24, and the other of these two processors may be external to the system 112, and may communicate with the system 112 via a TCP/IP network link.

The terms and expressions which have been employed in this application are used as terms of description and not of limitation, and there is no intention, in the use of such terms and expressions, of excluding any equivalents of the features shown and described or portions thereof, but it is recognized that various modifications are possible within the scope of the invention as claimed. For example, although the cache 16, disk controllers 18 . . . 20, and host controllers 22 . . . 24 have been described as being coupled via bus system 14, if system 112 is appropriately modified, the cache 16, disk controllers 18 . . . 20, and host controllers 22 . . . 24 may be coupled together and communicate via a matrix of point-to-point data transfer and messaging systems, e.g., of the type disclosed in copending U.S. patent application Ser. No. 09/745,814 entitled, "Data Storage System Having Crossbar Switch With Multi-Staged Routing," filed Dec. 21, 2000; this copending application is owned by the Assignee of the subject application, and is hereby incorporated by reference herein in its entirety.

Other modifications are also possible. For example, the circuitry 308 in adapter 26 may be configured to supply to the controller 24 via the adapter identification interface comprised in the interfaces 418 a value that identifies the type and configuration of the adapter 26. This value may be used by the controller 24 to evaluate whether the controller 24 and adapter 26 are configured to operate properly together; if the controller 24 determines that controller 24 and adapter 26 are not so configured, the controller 24 may signal an error condition. Accordingly, the present invention should be viewed broadly as encompassing all modifications, variations, alternatives and equivalents as may be encompassed by the hereinafter-appended claims.

Other modifications are also possible. Accordingly, the present invention should be viewed broadly as encompassing all modifications, variations, alternatives and equivalents as may be encompassed by the hereinafter appended claims.

What is claimed is:

1. A network adapter that may be used in a network data storage system to permit data communication among data exchanging devices and a data storage system input/output (I/O) controller, the controller residing in the data storage system, the data exchanging devices being external to the adapter, the adapter comprising:

one or more interfaces that may be coupled to an electrical backplane of the system, the backplane being coupled to the controller and being configured to permit communication between the controller and the adapter when the one or more interfaces are coupled to the backplane; and a switching system integrated into the adapter, the switching system having a first set of ports that may be coupled to the data exchanging devices and a second set of ports that may couple the switching system to the controller when the one or more interfaces are coupled to the backplane, wherein the switching system is configured to selectively provide one of (i) communications between the controller and the data exchanging devices through the first and second sets of ports, and (ii) a test loop which loops the second set of ports back to the controller to enable the controller to diagnostically test controller operation and connectivity between the controller and the adapter through the backplane using a set of test vectors through the second set of ports;

wherein the switching system is further configured to isolate the controller from the data exchanging devices to avoid escape of signals from the controller to the data exchanging devices when the switching system selectively provides the test loop;

wherein the controller is a single circuit board having multiple Fibre Channel interfaces, and wherein the switching system is configured to daisy chain the multiple Fibre Channel interfaces of the single circuit board together exclusive of the data exchanging devices when the switching system selectively provides the test loop;

wherein the adapter is a host bus adapter device which interconnects between a host node and the controller, the controller being configured to operate as a front-end interface between the host node and a cache of the data storage system; and wherein the adapter further comprises:

control circuitry coupled to the one or more interfaces and further coupled to the switching system, the control circuitry being configured to perform host bus adapter operations to move data between the host node and the cache when the switching system is not selectively providing the test loop, the host bus adapter operations being different than disk adapter operations for moving data between the cache and the data exchanging devices.

2. The adapter of claim 1, wherein the one or more interfaces comprise at least one interface through which a command may be issued to the adapter to cause the adapter to change from an operational mode to a diagnostic mode.

3. The adapter of claim 1, wherein the data storage system comprises a set of mass storage devices that may exchange data with the data exchanging devices via the adapter.

4. The adapter of claim 1, wherein the adapter is assigned a network layer address based at least partially upon a slot identification number that identifies a location in the data storage system in which the adapter resides.

5. The adapter of claim 1, wherein the switching system comprises a fibre channel switching fabric.

6. The adapter of claim 1, wherein the one or more interfaces comprise a management interface through which the controller may issue via the backplane a command to the adapter.

7. The adapter of claim 1, wherein the one or more interfaces permit a processor to issue a command to the adapter via the backplane, the processor being external to the data exchanging devices, the adapter, and the controller.

8. The adapter of claim 7, wherein the processor is external to the data storage system.

9. The adapter of claim 7, wherein a first network address of the adapter may be changed during a configuration of the data storage system to a second network address, the processor being coupled to the adapter via a network, the adapter being accessible via the network using the second network address.

10. The adapter of claim 1, wherein the one or more interfaces include a first interface and a second interface, the first interface permitting the controller to issue a first command to the adapter for causing the adapter to change from a first mode of operation to a second mode of operation, the second interface permitting configuration-related information to be retrieved from a non-volatile memory comprised in the adapter.

11. The adapter of claim 10, wherein in the second mode of operation, a diagnostic test of the adapter is performed.

12. The adapter of claim 11, wherein the diagnostic test comprises one of a built-in self-test (BIST) of the adapter and a different test of the adapter, the different test including transmission of a test vector along a first test path in the adapter, the test path beginning and ending at a first I/O port that couples the adapter to the controller when the one or more interfaces are coupled to the backplane, the test path including a subset of the first set of ports of the switching system.

13. The adapter of claim 12, wherein the different test also includes the transmission of a test vector along a second test path in the adapter, the second test path beginning and ending at a different I/O port that couples the adapter to the controller when the one or more interfaces are coupled to the backplane, the second test path including a different subset of the first set of ports of the switching system.

14. The adapter of claim 1, wherein the adapter is an electrical circuit card that is configured to be electrically and mechanically coupled to the backplane.

15. A method of using a network adapter in a network data storage system to permit data communication among data exchanging devices and a data storage system input/output (I/O) controller, the controller residing in the data storage system, the data exchanging devices being external to the adapter, the adapter including one or more interfaces and a switching system, the method comprising:
coupling the one or more interfaces to an electrical backplane of the system, the backplane being coupled to the controller and being configured to permit communication between the controller and the adapter when the one or more interfaces are coupled to the backplane;
coupling a first set of ports of the switching system to the data exchanging devices;
coupling a second set of ports of the switching system to the controller; and
selectively providing one of (i) communications between the controller and the data exchanging devices through the first and second sets of ports, and (ii) a test loop which loops the second set of ports back to the controller to enable the controller to diagnostically test controller operation and connectivity between the controller and the adapter through the backplane using a set of test vectors through the second set of ports;
wherein selectively providing the test loop includes isolating the controller from the data exchanging devices to avoid escape of signals from the controller to the data exchanging devices;
wherein the controller is a single circuit board having multiple Fibre Channel interfaces, and wherein isolating includes daisy chaining the multiple Fibre Channel interfaces of the single circuit board together exclusive of the data exchanging devices;
wherein the adapter is a host bus adapter device which interconnects between a host node and the controller, the controller being configured to operate as a front-end interface between the host node and a cache of the data storage system; and
wherein selectively providing includes:
performing host bus adapter operations to move data between the host node and the cache when the switching system is not selectively providing the test loop, the host bus adapter operations being different than disk adapter operations for moving data between the cache and the data exchanging devices.

16. The method of claim 15, further comprising issuing a command through at least one interface of the one or more interfaces, the command being for causing the adapter to change from an operational mode to a diagnostic mode.

17. The method of claim 15, wherein the data storage system comprises a set of mass storage devices that may exchange data with the data exchanging devices via the adapter.

18. The method of claim 15, further comprising assigning a network layer address to the adapter based at least partially upon a slot identification number that identifies a location in the data storage system in which the adapter resides.

19. The method of claim 15, wherein the switching system comprises a fibre channel switching fabric.

20. The method of claim 15, wherein the one or more interfaces comprise a management interface, and the method also comprises issuing from the controller a command to the adapter via the backplane.

21. The method of claim 15, wherein the one or more interfaces permit a processor to issue a command to the adapter via the backplane, the processor being external to the data exchanging devices, the adapter, and the controller.

22. The method of claim 21, wherein the processor is external to the data storage system.

23. The method of claim 21, wherein a first network address of the adapter may be changed during a configuration of the data storage system to a second network address, the processor being coupled to the adapter via a network, the adapter being accessible via the network using the second network address.

24. The method of claim 15, wherein the one or more interfaces include a first interface and a second interface, the first interface permitting the controller to issue a first command to the adapter for causing the adapter to change from a first mode of operation to a second mode of operation, the second interface permitting configuration-related information to be retrieved from a non-volatile memory comprised in the adapter.

25. The method of claim 24, further comprising, causing the adapter to change from the first mode of operation to the second mode of operation, and when the adapter is in the second mode of operation, performing a diagnostic test of the adapter.

26. The method of claim 25, wherein the diagnostic test comprises one of a built-in-self-test (BIST) of the adapter and a different test of the adapter, the different test including transmission of a test vector along a first test path in the adapter, the test path beginning and ending at a first I/O port that couples the adapter to the controller when the one or more interfaces are coupled to the backplane, the test path including a subset of the first set of ports of the switching system.

27. The method of claim 26, wherein the different test also includes the transmission of a test vector along a second test path in the adapter, the second test path beginning and ending at a different I/O port that couples the adapter to the controller when the one or more interfaces are coupled to the backplane, the second test path including a different subset of the first set of ports of the switching system.

28. The method of claim 15, wherein the adapter is an electrical circuit card that is configured to be electrically and mechanically coupled to the backplane.

29. A network adapter configured to permit data communication among data exchanging devices and a data storage system input/output (I/O) controller of a network data storage system, the controller residing in the data storage system, the data exchanging devices being external to the data storage system, the network adapter comprising:
adapter interfaces configured to couple to an electrical backplane of the network data storage system, the electrical backplane being coupled to the controller and being configured to permit communication between the controller and the adapter when the adapter interfaces couple to the electrical backplane; and
a switching subsystem coupled to the adapter interfaces, the switching subsystem having a first set of ports configured to couple to the data exchanging devices and a second set of ports configured to couple to the controller when the adapter interfaces couple to the electrical backplane;
the switching subsystem being configured to selectively provide one of (i) communications between the controller and the data exchanging devices through the first and second sets of ports, and (ii) a test loop which loops the second set of ports back to the controller to enable the controller to diagnostically test controller operation and connectivity between the controller and the adapter through the backplane using a set of test vectors through the second set of ports;

the switching subsystem being further configured to isolate the controller from the data exchanging devices to avoid escape of signals from the controller to the data exchanging devices when the switching subsystem selectively provides the test loop;

the controller being a single circuit board having multiple Fibre Channel interfaces; and the switching subsystem being further configured to daisy chain the multiple Fibre Channel interfaces of the single circuit board together exclusive of the data exchanging devices when the switching subsystem selectively provides the test loop;

wherein the adapter is a host bus adapter device which interconnects between a host node and the controller, the controller being configured to operate as a front-end interface between the host node and a cache of the data storage system; and wherein the network adapter further comprises:

control circuitry coupled to the one or more interfaces and further coupled to the switching system, the control circuitry being configured to perform host bus adapter operations to move data between the host node and the cache when the switching system is not selectively providing the test loop, the host bus adapter operations being different than disk adapter operations for moving data between the cache and the data exchanging devices.

* * * * *